Figure 1:
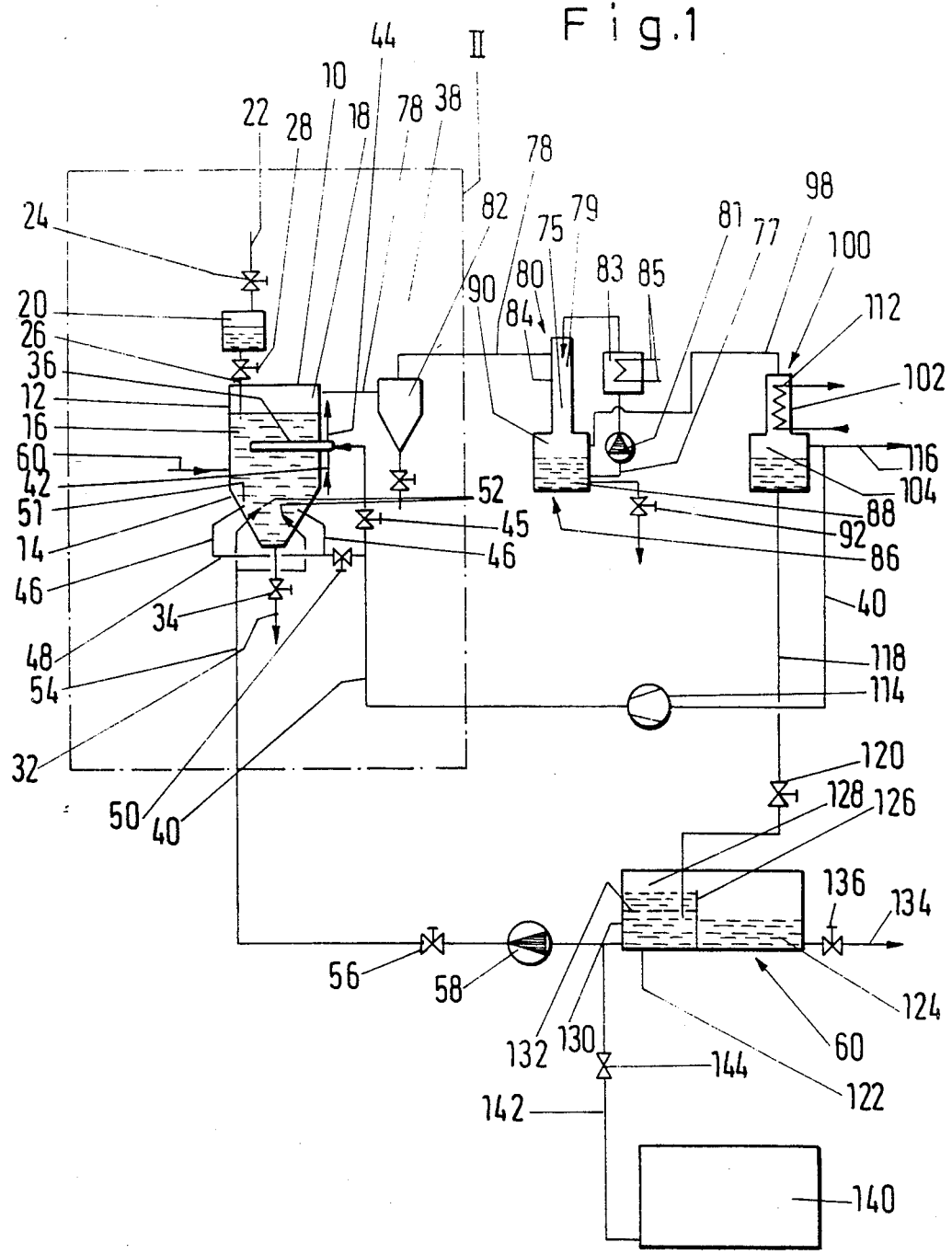

United States Patent [19]

Betz

[11] Patent Number: 4,960,440
[45] Date of Patent: Oct. 2, 1990

[54] PROCESS FOR REDUCING THE QUANTITY OF UNDESIRED COMPOUNDS IN THE GENERATION OF PYROLYSIS GAS

[75] Inventor: Monika Betz, Ketsch, Fed. Rep. of Germany

[73] Assignee: Asea Brown Boveri Aktiengesellschaft, Mannheim, Fed. Rep. of Germany

[21] Appl. No.: 274,502

[22] Filed: Nov. 21, 1988

[30] Foreign Application Priority Data

Nov. 19, 1987 [DE] Fed. Rep. of Germany ....... 3739157
Oct. 14, 1988 [DE] Fed. Rep. of Germany ....... 3835038

[51] Int. Cl.$^5$ .............................................. C10J 3/54
[52] U.S. Cl. ..................................... 48/197 R; 48/209;
201/20; 201/25; 201/29; 201/31; 585/240;
585/241
[58] Field of Search ............... 201/25, 28, 29, 30,
201/31, 20, 2.5, 29, 38; 48/197 R, 202, 206, 209,
211, 213, 214 R; 585/240–242; 252/373

[56] References Cited

U.S. PATENT DOCUMENTS

| | | | |
|---|---|---|---|
| 2,971,830 | 2/1961 | Kawai et al. ............................ | 48/206 |
| 4,082,615 | 4/1978 | Komura .................................. | 201/31 |
| 4,145,256 | 3/1979 | Bowen ................................... | 201/31 |
| 4,175,929 | 11/1979 | Frumerman et al. ................. | 48/202 |
| 4,203,804 | 5/1980 | Janning et al. ........................ | 201/31 |
| 4,211,540 | 7/1980 | Netzer ................................... | 48/202 |
| 4,364,796 | 12/1982 | Ishii et al. .............................. | 201/29 |
| 4,436,532 | 3/1984 | Yamaguchi et al. ................. | 48/209 |
| 4,448,589 | 5/1989 | Fan et al. ............................... | 48/209 |
| 4,588,477 | 5/1986 | Habib .................................... | 201/31 |
| 4,746,406 | 5/1988 | Timmann ............................. | 201/31 |

Primary Examiner—Peter Kratz
Attorney, Agent, or Firm—Herbert L. Lerner; Laurence A. Greenberg

[57] ABSTRACT

Process water is formed when pyrolysis gas obtained in the pyrolytic decomposition of a starting material is cooled. Due to its content of chemical compounds, it is very costly to dispose of or eliminate the process water. A process for reducing the quantity of by-products in the generation of pyrolysis gas recycles the process water to a pyrolysis reactor operating with a fluidized bed. As a result, the process water is reduced in quantity and purified in a simple manner, and the yield of pyrolysis gas is increased.

11 Claims, 2 Drawing Sheets

PROCESS FOR REDUCING THE QUANTITY OF UNDESIRED COMPOUNDS IN THE GENERATION OF PYROLYSIS GAS

The invention relates to a process for reducing the quantity of by-products and/or undesired compounds contained therein during the generation of pyrolysis gas from hydrocarbon-containing starting material, especially waste material, the pyrolysis gas being generated by pyrolytic decomposition of the starting material in a pyrolysis reactor in a reducing atmosphere and the water vapor carried over by the pyrolysis gas being precipitated as process water in a cooling stage.

Suitable hydrocarbon starting materials are such organic waste materials including plastic wastes, used tire, spent oils, oil residues, oil sludge and the like. Such materials releases water during thermal decomposition.

Pyrolysis gas, which is produced by thermal decomposition of waste material, contains hydrocarbons and a number of undesired pollutants which depend on the nature and composition of the starting material. Such pollutants may be compounds of nitrogen, chlorine, sulphur and fluorine and cyano compounds, as mentioned in German Published, Non-Prosecuted Application DE-OS 29 44 989. In the present case, these pollutants are designated as by-products, whereas the pyrolysis gas is the main product of the pyrolysis. In order to reduce the quantity of the by-products, it is known to introduce a basic binder, such as lime, into a rotary kiln used as the pyrolysis reactor. However, this has the disadvantage of requiring a disproportionately large quantity of lime to be used, as compared to the starting material. A further point is that the pyrolysis residue mixes with the lime which has reacted with the pollutants, and a correspondingly large quantity of waste products with a high proportion of pollutants is thus obtained, which is expensive to dispose of. The above-cited German Published, Non-Prosecuted Application therefore proposes an approach which requires small quantities of binder and markedly reduces the proportion of pollutants in the waste product.

During cooling of the pyrolysis gas to a temperature below the dew point of water, which is carried out in order to recover the low-boiling pyrolysis oil contained in the pyrolysis gas, the water vapor carried over by the pyrolysis gas or contained therein precipitates as process water. This process water is likewise an undesired by-product. During the condensation step, the process water absorbs constituents of the pyrolysis gas. Depending on the nature and composition of the starting material, in addition to pure hydrocarbons, the pyrolysis gas also contains pollutants such as halogenated hydrocarbons, hydrogen cyanide gas, hydrogen sulphide, heavy metals and undesired compounds containing heteroatoms, such as for example, nitriles, pyrrolic compounds and the like. Since disposal of the processed water can only be carried out at considerable cost, for example by deposition in a dump due to the pollutants contained therein, it is desirable to reduce the quantity of process water and/or to minimize its pollutant content.

It is accordingly an object of the invention to provide a process for reducing the quantity of by-products in the generation of pyrolysis gas, which overcomes the hereinafore-mentioned disadvantages of the heretofore-known methods of this general type, which minimizes the quantity of process water in a simple manner and/or which reduces the quantity of pollutants and undesired compounds contained in the process water.

With the foregoing and other objects in view there is provided, in accordance with the invention, a process for reducing the quantity of by-products and/or undesired compounds contained therein during the generation of pyrolysis gas from hydrocarbon-containing starting material, especially waste material, which comprises generating pyrolysis gas by pyrolytic decomposition of starting material in a pyrolysis reactor in a reducing atmosphere, precipitating water vapor carried by the pyrolysis gas as process water in a cooling stage, feeding the process water to a fluidized bed formed in the pyrolysis reactor, and pyrolytically processing the starting material with the process water at a temperature above 650° C.

The first result of this process is a reduction in the quantity of process water. This is because carbon precipitates during operation on the fluidized material of the fluidized bed, which is preferably fine-grain sand, and the carbon reacts with at least a part of the process water which is fed and which has been vaporized in the reactor, under the reducing atmosphere of the fluidized bed at a minimum temperature of approximately 650° C. The process water vapor is thus split into hydrogen ($H_2$) and carbon monoxide (CO). Since these two gases are combustible, they lead to a valuable enrichment of the combustible pyrolysis gas. In addition, a reduction in the pollutant content is achieved: In fact, the process water which is fed and is in the gaseous form, undergoes the pyrolysis process taking place in the pyrolysis reactor and is, in a manner of speaking, pyrolitically purified. As a result, especially relatively large molecules still present in the process water are cracked, defunctionalized and thus yield low-molecular compounds which preferably remain in the gas phase even at lower temperatures below 50° C., and have a lower pollution potential or none at all.

For the above-mentioned reactions, a minimum temperature of 650° C. is necessary, but better results are obtained at a minimum temperature of 700° C. A value of approximately 1000° C. is regarded as the upper limit of the working temperature. As a result of the interaction of the measures according to the invention, the object underlying the invention is thus achieved in a surprisingly simple manner.

In order to obtain advantageous results, a long residence time of the process water fed in the fluidized bed is desirable. It is therefore advisable to feed the process water in the lowest region of the fluidized bed. In most cases, this applies if, in accordance with another mode of the invention, there is provided a process which comprises feeding the process water to the fluidized bed in the vicinity of a fluidizing-gas inlet leading into the pyrolysis reactor.

Since the process water must be in the form of vapor for the reaction of the process water in the fluidized bed, it is necessary to ensure the fastest possible vaporization of the process water in the fluidized bed. Therefore, in accordance with a further mode of the invention, there is provided a process which comprises feeding the process water to the fluidized bed in a finely dispersed form. Advantageously, this is accomplished by means of at least one spray nozzle, and a plurality of spray nozzles is preferably provided.

In accordance with an added mode of the invention, there is provided a process which comprises feeding the process water at a mass flow of at least 3 to 5 % and preferably 10 % of the mass flow of the starting material On one hand, this leads to a pronounced reduction in the quantity of process water and, on the other hand, it hardly affects the pyrolysis step. Too high a mass flow of process water could in fact lead to undesirably large temperature reductions in the fluidized bed or it could greatly increase the outlay for heating the fluidized bed.

In accordance with an additional mode of the invention, there is provided a process which comprises finely dispersing a basic binder into the fluidized bed when the pyrolysis gas contains chlorine compounds, fluorine compounds, sulphur compounds or cyano compounds.

If the pyrolysis gas generated in the fluidized bed contains one or more of the above-mentioned pollutants and components, the basic binder is preferably introduced into the fluidized bed in a finely dispersed form. Therefore, in accordance with yet another mode of the invention, there is provided a process which comprises selecting, as the basic binder, at least one material selected from the group consisting of calcium carbonate, hydrated lime, calcium oxide, magnesium carbonate, magnesium oxide, magnesium hydroxide, dolomite, sodium carbonate and sodium hydroxide. Since intimate mixing of the binder with the pyrolysis gas being generated takes place in the fluidized bed, it is sufficient in most cases for binding the pollutants to feed the binder in the stoichiometric ratio. This means that only the theoretically required quantity is fed.

In accordance with yet a further mode of the invention, there is provided a process which comprises storing any excess process water in a storage tank and feeding this excess process water to the fluidized bed during the pyrolytic decomposition of a starting material which generates little or no process water, this excess results when more process water is produced than is suitable for feeding to the fluidized bed.

In accordance with yet an added mode of the invention, there is provided a process which comprises diverting a part of the process water before the process water enters the fluidized bed, and introducing the diverted part of the process water into the pyrolysis gas flowing out of a gas space in the pyrolysis reactor. As a result, the pyrolysis gas flowing out is cooled and therefore the thermal stress on the crude gas pipe and the further components connected thereto is reduced. The service life of these components is thus substantially extended. Introduction of the diverted process water into the hot pyrolysis gas is particularly advisable whenever the fluidized bed is heated by heating tubes, which additionally release heat to the gas space above the fluidized bed and heat up the pyrolysis gas. This is the case with a vertical introduction of the heating tubes through the top of the pyrolysis reactor down into the fluidized bed.

In accordance with yet an additional mode of the invention, there is provided a process which comprises introducing the diverted part of the process water into a crude gas pipe in the vicinity of the pyrolysis reactor. The point of introduction of the process water in this case is advantageously at a distance from the pyrolysis reactor which is equal to from twice to five times the internal width of the crude gas pipe. This achieves rapid vaporization of the process water and effective cooling of the pyrolysis gas. This cooling amounts to between 50 and 150° C. so that the service life of the crude gas pipe and the further components subject to the hot pyrolysis gas, is markedly extended.

In accordance with a concomitant mode of the invention, there is provided a process which comprises diverting and introducing ⅓ to 1/7 and preferably 1/5 of the process water into the pyrolysis gas. This results in a sufficient reduction in the quantity of process water and, at the same time, in a marked lowering of the temperature of the pyrolysis gas.

Other features which are considered as characteristic for the invention are set forth in the appended claims.

Although the invention is illustrated and described herein as embodied in a process for reducing the quantity of by-products in the generation of pyrolysis gas, it is nevertheless not intended to be limited to the details shown, since various modifications may be made therein without departing from the spirit of the invention and within the scope and range of equivalents of the claims.

The method of operation of the invention, however, together with additional obJects and advantages thereof will be best understood from the following description of specific embodiments when read in connection with the accompanying drawings.

Figure 2:
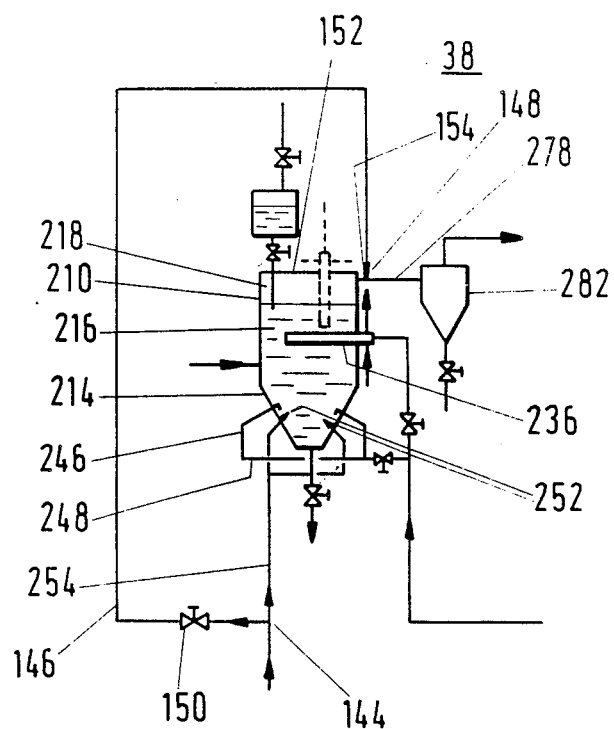

FIG. 1 is a diagrammatic and schematic circuit diagram of a unit suitable for carrying out the process according to the invention, wherein the process water is fed only into the fluidized bed; and FIG. 2 is a view similar to a portion of FIG. 1 showing another embodiment of the unit according to FIG. 1, with introduction of process water into the fluidized bed and into the pyrolysis gas.

Referring now to the figures of the drawing in detail and first, particularly, to FIG. 1 thereof, there is seen an upright pyrolysis reactor 10 having a circular-cylindrical upper region 12 and a tapering circular-conical lower region 14 joining the upper region from below. In the pyrolysis reactor 10, the fluidized bed 16 is formed in such a way that a free gas space 18 which remains above the fluidized bed 16 has a height that is about 20 to 30% of the height of the pyrolysis reactor. The fluidizing material which forms the fluidized bed is fine-grained and advantageously is formed of sand or aluminum oxide.

Above the pyrolysis reactor 10 is a storage or stock vessel 20, into which fine-grained binder is introduced through a pipe 22 with an inserted shut-off device 24. The storage vessel 20 is connected to the pyrolysis reactor with a gradient through a line 26 with an inserted shut-off and control device 28. The line 26 ends as deeply as possible in the fluidized bed 16.

A discharge line 32 for the pyrolysis residue contains a shut-off and control device 34 and is connected to the pyrolysis reactor 10 at the lower end of the region 14.

At least one gas-fired heating tube 36 is introduced horizontally from an outer space 38 into the upper circular-cylindrical region 12 of the pyrolysis reactor. For gas supply, this heating tube is connected to a pyrolysis gas line 40 which carries the pyrolysis gas generated in the unit. Furthermore, a feed line 42 for combustion air and an exhaust or exit gas line 44 for discharging the exit or exhaust gas into the outer space, are connected to the heating tube 36.

Fluidizing-gas lines 46, which are connected to a gas line 48, lead into the interior in the lower, circular-conical region 14 of the pyrolysis reactor. The gas line 48 is connected to the pyrolysis gas line 40 through a shut-off and control device 50. The blowing-out direction of the fluidizing-gas lines 46 in the pyrolysis reactor points downwards and runs approximately parallel to the wall of the pyrolysis reactor.

In the vicinity of those points where the fluidizing-gas lines 46 lead into the pyrolysis reactor, that is to say in the vicinity of a fluidizing gas inlet 51, several spray nozzles 52, for example 3 to 5 spray nozzles, are provided in the interior of the pyrolysis reactor. These spray nozzles serve for feeding the process water into the fluidized bed. For this purpose, the spray nozzles 52 are connected to a pipe 54 which leads through a shut-off and control device 56 and a pump 58, to a separator vessel 60. The process water is collected in the separator vessel 60. The structure of the separator vessel is described below. The spray nozzles 52 are uniformly distributed over the cross-section of the pyrolysis reactor.

A crude gas pipe 78 leads from the gas space 18 of the pyrolysis reactor, through a cyclone separator 82, to a cooling stage 80. The cooling stage 80 operates with direct cooling and has a cooler 84. The crude gas pipe 78 ends in the upper region of a vertical circular-cylindrical cooling channel 75 of the cooler 84. A closed separator vessel 86 is connected to the lower end of the cooling channel 75. The lower region of the separator vessel has a space 88 for heavy oil, and a free gas space 90 remains above it. A line 92 which has a shut-off device and serves for drawing off the heavy oil that arises, is provided in the vicinity of the bottom of the space 88. Furthermore, a line 77 which leads to a spray nozzle 79 disposed in the upper end region of the cooling channel 75, is connected to the bottom of the space 88. The spray nozzle 79 is disposed in the center of the cooling channel 75, and its spray direction is vertically downwards. A pump 81 and a cooler 83 are inserted into the line 77. The cooler 83 has a cooling coil which is supplied through lines 85 with a cooling medium, preferably cooling water.

A pipe 98 leads from the gas space 90 of the cooling stage 80 to the inlet of a further cooling stage 100, which operates with indirect cooling. The further cooling stage 100 has an upright, circular-cylindrical further cooler 102. The pipe 98 is connected to the upper end and a tank 104 is connected to the lower end of the further cooler 102.

The pyrolysis gas line 40 is connected from the upper region of the tank 104 through a gas compressor 114 in order to supply the gas required for operating the pyrolysis reactor 10. A line 116 is also connected to the pyrolysis gas line 40 upstream of the compressor 114, for withdrawing the excess pyrolysis gas. If it is necessary or expedient for treatment of the pyrolysis gas, at least one more non-illustrated cooling stage and/or at least one non-illustrated gas scrubber are inserted between the tank 104 and the pyrolysis gas line 40.

The bottom region of the tank 104 is connected to the separator vessel 60 through a pipe 118 with an inserted shut-off and control device 120. If necessary, a non-illustrated pump may also be inserted into the pipe 118. The closed separator vessel 60 contains a separating space 122 for phase separation and a light oil space 124 for the low-boiling pyrolysis oil. The separating space and the light oil space are separated from one another by a partition 126. The partition 126 extends vertically upwards from the bottom of the separator vessel, but its height is about 10 to 30% less than the clear or open height of the separator vessel 60. The low-boiling pyrolysis oil floats in the separating space 122 because of its lower density. The partition 126 thus forms an overflow weir, over which the low-boiling pyrolysis oil passes into the light oil space 124. Since the quantity of low-boiling pyrolysis oil obtained is greater than the quantity of process water obtained, the volume capacity of the light oil space 124 is about 1.5 to 3 times the volume capacity of the separating space 122.

The pipe 118 starting from the tank 104 ends in the separating space 122, advantageously in a region 132 of phase separation between process water and low-boiling pyrolysis oil. The region of phase separation is located approximately at half the height of the overflow weir. The pipe 54 leading to the spray nozzles 52 located in the pyrolysis reactor, is connected to the separating space 122 at the lowest point possible. As viewed in the direction of flow, the pump 58 and the shut-off and control device 56 are inserted in the pipe 54.

During operation, the fluidizing material introduced into the pyrolysis reactor is fluidized by means of pyrolysis gas, so that the fluidized bed 16 is produced. The pyrolysis gas is fed through the fluidizing-gas lines 46 from the gas line 48 and the pyrolysis gas line 40. Pyrolysis gas is thus used as the fluidizing gas. The flow of fluidizing gas in this case is adjusted to the required rate by means of the shut-off and control or restrictor device 50. In order to heat the fluidized bed, pyrolysis gas from the pyrolysis gas line 40 is also fed to the heating tube 36, with the gas flow being adjusted by a shut-off and restriction device 45 to the required heat output of the heating tube 36. The pyrolysis gas is burned in the heating tube. Combustion air is fed to the heating tube 36 through the feed line 42, and the exhaust gases are passed from the heating tube 36 through the exhaust gas line 44 into the outer space 38, advantageously by means of a stack which is not shown. The fluidized bed is indirectly heated by means of the heating tube 36 to an intended temperature of 700° C. Advantageously, a plurality of heating tubes is provided.

At the same time, the starting material is introduced into the fluidized bed 16 in the direction of an arrow 60' through non-illustrated feeder devices. The starting material advantageously is formed of organic waste material, in particular plastic wastes, old tires, spent oils, oil residues, oil sludge or the like. In general terms, the starting material represents hydrocarbon wastes which are moist and/or release water molecules during thermal decomposition in the pyrolysis reactor. This starting material, which, if necessary, has been comminuted before the pyrolysis to a lump size of 3 to 20 cm, and preferably 5 to 10 cm, is heated in the fluidized bed 16 to the minimum temperature or higher. If the starting material is formed of spent oil, oil residue, oil sludge or the like, the starting material is made pumpable and mobile by heating and then spraying into the fluidized bed through nozzles in a non-illustrated manner.

In the pyrolysis reactor, the starting material is decomposed with the formation of combustible pyrolysis gas, the moisture contained in the starting material being expelled partially in the gaseous form and being a constituent of the pyrolysis gas. Additionally, new water molecules, which likewise mix with the pyrolysis gas, are formed in the decomposition of the starting material, depending on the nature of the latter. This pyrolysis gas collects in the gas space 18 and is fed to the cooling stage 80 by means of the pipe 78 through the cyclone separator 82, in which entrained solids are precipitated In the cooling stage 80, pumpable oil is withdrawn from the space 88 and delivered through the pump 81 and the cooler 83 to the cooling channel 75 and is sprayed out at that location by the spray nozzle 79. At the same time, the pyrolysis gas is introduced into the cooling channel 75, so that it flows downwards together with the sprayed oil to the separator vessel 86. At the same time, the hot pyrolysis gas is also cooled to a temperature of approximately 150 to 250° C. The heat thus absorbed by the circulating oil is released by the cooler 83 to the cooling water which is supplied and discharged through the lines 85.

During cooling, a part of the hydrocarbons of the pyrolysis gas condenses to yield heavy oil, and the pyrolysis gas/heavy oil mixture flows downwards into the separator vessel 86. In the vessel 86, the heavy oil separates from the pyrolysis gas and collects in the space 88 whereas the pyrolysis gas is in the gas space 90 located above. The heavy oil in the space 88 is withdrawn by means of the line 92 and passed along for further processing. However, a sufficient part of the heavy oil must always remain in the space 88 in order to safeguard the operation of the cooling stage 80. Since the pyrolysis gas in the cooling stage 80 is cooled to a temperature of 150 to 200° C. under ambient pressure, the water vapor contained in the pyrolysis gas does not condense but is a constituent of the pyrolysis gas in the gas space 90.

The pyrolysis gas is fed from the gas space 90 through the pipe 98 to the further cooling stage 100. While flowing downwards in the further cooler 102, the pyrolysis gas is cooled by a cooling coil 112. The cooling medium used is cooling water or cooling brine In the cooler, a low-boiling pyrolysis oil, which initially collects in the tank 104, is formed by partial condensation of the hydrocarbons of the pyrolysis gas. Since the pyrolysis gas is cooled in the further cooling stage 100 at ambient pressure to a temperature of 20 to 60° C., the water vapor carried over by the pyrolysis gas condenses and precipitates as process water. The process water collects together with the low-boiling pyrolysis oil in the tank 104 and flows from there through the pipe 118 and the open shut-off and control device 120 into the separating space 122 of the separator vessel 60. The low-boiling pyrolysis oil and the process water separate in the separating space 122. Since the low-boiling pyrolysis oil has a lower density than that of the process water, it collects as a layer 128 above a process water layer 130, which fills the lower region of the separating space 122.

When the liquid level in the separating space 122 reaches the upper edge of the partition 126, the low-boiling pyrolysis oil runs over the partition into the light oil space 124 and is collected there. The low-boiling pyrolysis oil is then withdrawn from the light oil space 124 and passed to further processing by means of a pipe 134, after a shutoff device 136 has been opened.

The pump 58 and the pipe 54 continuously feed the process water collecting in the lower region of the separating space 122 to the spray nozzles 52, which spray the process water into the lower region of the fluidized bed 16. The mass flow of the process water in this case is regulated to suitable values by means of the shut-off and control device 56.

Since the process water is introduced through the nozzles 52 into the fluidized bed in a finely dispersed form, the process water vaporizes immediately after it has been introduced into the fluidized bed. The resulting process water vapor is thermally decomposed in the fluidized bed, and molecular hydrogen as well as carbon monoxide are formed. In this case the coating of soot or carbon on the fluidized-bed material plays a decisive role. This coating is produced during the decomposition of the carbon-containing starting material and supplies the carbon component for the formation of carbon monoxide in the thermal decomposition of the water vapor. Since this coating continuously reforms, this reaction is ensured even in long-term operation.

Thermally decomposable polar hydrocarbon compounds which in many cases are still present in the process water, are carried along by the pyrolysis gas as far as the further cooling stage 100 and in most cases contain functional groups. Therefore, cleavage and degradation of these hydrocarbon compounds to yield low-molecular compounds which cause fewer problems and are gaseous and some of which are combustible and thus increase the calorific value of the pyrolysis gas, takes place at the same time in the fluidized bed 16. Moreover, the pollutant content of the product water is reduced due to the defunctionalization of the organic constituents. This process achieves an elimination or at least a partial elimination of the process water arising during the pyrolysis and at the same time increases the yield of combustible pyrolysis gas, in a simple manner.

If the fluidized bed is fed with starting materials which evolve acidic pollutants upon pyrolytic decomposition, a basic binder is introduced into the fluidized bed 16 during the pyrolysis step. For this purpose, the basic binder which has been introduced beforehand through the pipe 22 into the storage vessel, is fed to the fluidized bed 16 by means of the line or pipe 26. The flow of binder in this case is adjusted by means of the shut-off and control device 28. The basic binder reacts with the pollutants formed during the pyrolysis of the starting material, to yield unobjectionable solid compounds which are withdrawn from the lower end of the pyrolysis reactor together with the pyrolysis residues through the discharge line 32. In the case of feeding basic additives and simultaneous recycling of the pollutant-containing process water into the fluidized bed, it is possible to bind the acidic components which are split off during renewed passage through the fluidized bed, in order to yield solid salts which remain in the residue. In addition to the defunctionalization of polar molecules and the reduction in the quantity of process water, a purification of the additionally produced gas is thus achieved.

The basic binders used are advantageously at least one material from the group comprising calcium carbonate, hydrated lime, calcium oxide, magnesium carbonate, magnesium oxide, dolomite or sodium hydroxide. The particle size of the binders is preferably 0.2 to 1 mm. The binders are employed individually or as mixtures.

If more process water than is suitable or permissible for feeding into the fluidized bed during the pyrolysis step is formed in the pyrolysis of starting material, this excess process water is advantageously taken to a storage tank 140. This storage tank 140, which is shown in FIG. 1, is connected through a pipe 142 with an inserted shut-off device 144, to the lower region of the separating space 122 or to the pipe 54 at a location between the separating space 122 and the pump 58. After the shut-off device 144 has been opened, the excess process water flows into the storage tank 140 and is stored therein.

The excess process water is stored until the processing of a starting material which produces hardly any or no process water at all during pyrolysis, that is to say wherein the process water mass flow is less than 10% of the starting material mass flow. The stored, excess process water is then withdrawn from the storage tank 140 and, if appropriate, it is fed together with process water arising in the separating space 122 to the pyrolysis reactor and is subjected to the pyrolysis or thermal decomposition, as described above.

Another embodiment of a portion II of FIG. 1 is shown in FIG. 2. Individual components of the unit according to FIG. 1 which are also present in the unit according to FIG. 2, have reference numerals which are increased by 200 in FIG. 2. In other respects, reference numerals have been omitted which are not necessary for an understanding of the invention.

The pyrolysis reactor 210 is essentially of exactly the same structure as the pyrolysis reactor 10 of FIG. 1. The fluidized bed 216 is located in the pyrolysis reactor 210. Above the fluidized bed is the gas space 218, in which the combustible pyrolysis gas collects. The crude gas pipe 278, which leads through the cyclone separator 282 to the cooling stage which is not shown in FIG. 2, is connected to the gas space 218. The spray nozzles 252 which are connected to the pipe 254 are located in the lower region of the fluidized bed 216. The process water is fed through the pipe 254.

Contrary to the unit according to FIG. 1, a diversion point 144 is provided in the pipe 254 in the unit according to FIG. 2. A pipe 146 leads from this diversion point to the crude gas pipe 278 and ends there at a connection point 148 on the crude gas pipe. The end of the pipe 146 is provided with at least one spray nozzle 154, so that the process water fed through the pipe 146 is sprayed into the crude gas pipe 278. Preferably, the spray direction of the spray nozzle 154 is opposite to that of the pyrolysis gas flowing in the crude gas pipe 278. The spray nozzle 154 and the placement thereof is only indicated in FIG. 2. A shut-off and control device 150 is also inserted into the pipe 146. The connection point 148 is at a distance from the pyrolysis reactor 210 which is preferably three times the internal width of the crude gas pipe 278. The connection point 148 is located between the pyrolysis reactor 210 and the cyclone separator 282.

During operation of the unit, which proceeds exactly as described in connection with FIG. 1, the process water flowing in the pipe 254 is divided at the diversion point 144. The result of suitable adjustment of the shut-off and control device 150 is that a part of the process water feed flows through the pipe 254 to the spray nozzles 252 and is sprayed into the fluidized bed 216. The other part of the process water flows through the pipe 146 to the connection point 148 and is sprayed by the spray nozzle 154 located there into the hot pyrolysis gas which flows in the crude gas pipe 278. At the connection point 148, the pyrolysis gas is approximately at the temperature which prevails in the pyrolysis reactor.

The method described above achieves precooling of the pyrolysis gas in the crude gas line 278. This precooling is particularly necessary if the heating tube 236 extends vertically from the top 152 of the pyrolysis reactor through the gas space 218 into the fluidized bed 216. In fact, the pyrolysis gas in the gas space 218 in this case is heated in an undesired manner by the heating tube 236. This additional heating of the pyrolysis gas is eliminated by the introduction of process water into the hot pyrolysis gas flowing in the crude gas pipe. In FIG. 2, the vertically running heating tube is shown in phantom. Advantageously, a plurality of vertical heating tubes is provided.

We claim:

1. Process for improving yields and for reducing the quantity of undesired compounds obtained during the generation of pyrolysis gas from hydrocarbon-containing waste starting materials, which comprises the steps of generating pyrolysis gas by the pyrolytic decomposition of said starting material in a fluidized bed pyrolysis reactor in a reducing atmosphere, cooling and condensing the water vapor and undesired compounds formed and entrained by the pyrolysis gas as process water in a cooling stage, recycling and spray feeding at least a portion of the condensed process water to the fluidized bed section of the pyrolysis reactor, and pyrolytically processing the starting material with the portion of the process water fed therein at a temperature above 650° C.

2. Process according to claim 1, which comprises feeding the process water to the fluidized bed in the vicinity of a fluidizing-gas inlet leading into the pyrolysis reactor.

3. Process according to claim 1, which comprises feeding the process water at a mass flow rate of at least about 3 % of the mass flow of the starting material.

4. Process according to claim 1, which comprises feeding the process water at a mass flow rate of about 10 % of the mass flow of the starting material.

5. Process according to claim 1, which comprises dispersing a basic material into the fluidized bed when the pyrolysis gas contains chlorine compounds, fluorine compounds, sulphur compounds or cyano compounds as a scavenging binder for said compounds.

6. Process according to claim 5, which comprises selecting as the basic material at least one material selected from the group consisting of calcium carbonate, hydrated lime, calcium oxide, magnesium carbonate, magnesium oxide, dolomite and sodium hydroxide.

7. Process according to claim 1, which also comprises, when more process water is produced than is suitable for feeding to the fluidized bed, storing such excess process water in a storage tank and feeding the excess process water to the fluidized bed during the pyrolytic decomposition of a starting material which generates little or no process water.

8. Process according to claim 1, which further comprises diverting a part of the process water before feeding the process water into the fluidized bed, and introducing the diverted part of the process water into the pyrolysis gas exiting from the gas space of the pyrolysis reactor.

9. Process according to claim 8, which comprises introducing the diverted part of the process water into a crude gas pipe in the vicinity of the pyrolysis reactor.

10. Process according to claim 8, which comprises diverting and introducing ⅛ to 1/7 of the process water into the pyrolysis gas.

11. Process according to claim 8, which comprises diverting and introducing 1/5 of the process water into the pyrolysis gas.

* * * * *